United States Patent Office 3,170,961
Patented Feb. 23, 1965

3,170,961
PROCESS FOR SEPARATING DICHLOROBENZENE ISOMERS
Edgar C. Britton and Floyd L. Beman, Midland, Mich., assignors to The Dow Chemical Company, Midland, Mich., a corporation of Delaware
No Drawing. Filed Feb. 24, 1961, Ser. No. 91,310
15 Claims. (Cl. 260—650)

This invention relates to a new and improved process for the separation of isomeric dichlorobenzenes. More particularly, it relates to a process whereby m-dichlorobenzene is more conveniently separated from dichlorobenzene mixtures comprising the meta and para isomers.

m-Dichlorobenzene is a valuable intermediate for many chemical products not readily obtainable from other materials. For many such products, it is most advantageous to have m-dichlorobenzene of relatively high purity available as a raw material.

In the past, m-dichlorobenzene had been made by indirect and costly methods, primarily laboratory preparations. Preparations by the decarboxylation of 2,6-dichlorobenzoic acid and by the diazotization of m-chloroaniline followed by a Sandmeyer reaction are illustrative.

More recently, mixtures of isomeric dichlorobenzene consisting largely of the meta and para isomers, have become available from the gas phase chlorination of chlorobenzene and from the isomerization of ortho or paradichlorobenzene by heating with a Lewis acid catalyst, for example $AlCl_3$. Dichlorobenzene mixtures so obtained ordinarily are composed of 55–65% m-dichlorobenzene, 20–30% p-dichlorobenzene, and 10–15% o-dichlorobenzene, this range of compositions representing approximately the equilibrium mixture. However, the separation of a pure grade of m-dichlorobenzene from these mixtures by conventional distillation methods is difficult because of the close boiling points of the three dichlorobenzene isomers. Particularly difficult for this reason is the separation of pure m-dichlorobenzene from the para isomer.

A procedure described in Bull. soc. chim. (2) 48, 112 (1887) for the separation of m-dibromobenzene from dibromobenzene mixtures has been applied to the corresponding chloro compounds. This method involves the preferential sulfonation of m-dichlorobenzene with fuming sulfuric acid and regeneration of the m-dichlorobenzene by decomposition of the m-dichlorobenzenesulfonic acid in hot aqueous sulfuric acid. The harsh conditions and reagents of this method result in relatively low recovery of the original m-dichlorobenzene content. For example, from a mixture consisting of 76% m-dichlorobenzene and 24% p-dichlorobenzene, there was obtained only about 50% of the para isomer and about 78% of the meta isomer by using this method of separation. This process also requires the use of expensive materials of construction to withstand the corrosive mixtures encountered.

An object of the present invention is to separate m-dichlorobenzene from mixtures of isomeric dichlorobenzenes comprising the meta and para isomers in an efficient manner using moderate conditions and conventional equipment. Another object is to make readily available m-dichlorobenzene of high purity. A further object is to prepare 1-bromo-2,4-dichlorobenzene. Other objects will become apparent in the detailed description which follows.

It has been found that by reacting mixed dichlorobenzenes consisting largely of the meta and para isomers with up to about one mole of a brominating agent per mole of combined meta and ortho isomers therein contained, in the presence of an effective amount of a bromination catalyst, the m-dichlorobenzene and o-dichlorobenzene are brominated to the corresponding bromodichlorobenzenes and the p-dichlorobenzene present is left substantially unaffected. The unbrominated dichlorobenzene, chiefly p-dichlorobenzene, is removed from the reaction mixture, ordinarily by fractional distillation after neutralization or removal of the bromination catalyst and residual halogen acid. After the unbrominated portion of the reaction mixture has been removed, the remaining brominated portion, either as such or purified by distillation, may then be debrominated to dichlorobenzene by reacting with approximately one molar equivalent of hydrogen per mole of aromatic bromide while dissolved in an inert liquid medium and in the presence of a hydrogenation catalyst and a halogen acid acceptor. This debromination process is described in Britton and Keil, U.S. 2,725,405.

The brominating agent used in our process is bromine or bromine chloride, BrCl, prepared by combining equal molar proportions of bromine and chlorine. Bromine and bromine chloride are equivalent in the reaction, up to about one mole of either being used per mole of combined m-dichlorobenzene and o-dichlorobenzene. Use of substantially more than one mole results in bromination of some para isomer, thus preventing a clear cut separation. Where desired, less than one mole of brominating agent may be employed and the unbrominated dichlorobenzene recycled in the process.

While our process may be used for separating meta and orthodichlorobenzene from paradichlorobenzene contained in such ternary equilibrium mixtures as previously described, it is primarily designed to remove the para isomer from dichlorobenzene mixtures containing reduced quantities of the ortho isomer or essentially no ortho isomer at all, thus making available m-dichlorobenzene of corresponding purity. Reduction of the ortho isomer content in such ternary mixtures is easily accomplished by fractional distillation. Essentially all of the o-dichlorobenzene may be removed by careful fractional distillation through a highly efficient distillation column. On the other hand, the ortho content may be reduced to about 5% or less of the entire mixture by a preliminary distillation through a column of relatively low efficiency.

o-Dichlorobenzene reacts with bromine or bromine chloride in our process at about the same rate as the meta isomer. Therefore, when a quantity of brominating agent equivalent to the combined ortho and meta content is reacted with a ternary mixture such as described, substantially all the ortho and meta content is found in the bromodichlorobenzene fraction thereby obtained. Debromination of this fraction thereupon regenerates the ortho and metadichlorobenzene together. If desired, pure m-dichlorobenzene may be obtained by fractional distillation of this mixture.

Our new process operates under moderate conditions and requires only conventional equipment. The bromination step may be carried out in a wide range of temperatures. Ordinarily, temperatures between about 0° C. and about 170° C. are suitable. The reaction time varies with the reaction temperature.

A catalyst known to promote nuclear substitution of bromine in aromatic compounds is used for the bromination step. Such catalysts include the bromides and chlorides of iron and aluminum, added to the reaction mixture as such or prepared in situ from the metals in the course of the reaction. The amount of catalyst is not critical so long as it is enough to be catalytically effective in the reaction. Good results are obtained with about 0.1–1.0% by weight of bromination catalyst based on the weight of dichlorobenzene.

Although such a mode of operation is not ordinarily of advantage, the bromination may be carried out in solution, using a halogenated aliphatic hydrocarbon solvent which is substantially unreactive in the process. Such solvents include carbon tetrachloride, chloroform, methylene chloride, perchloroethylene, ethylene dibromide, tetrachlorodifluoroethane, and the like. Results so obtained are equivalent to those where no solvent is used.

After the bromination reaction, the bromination catalyst and any residual halogen acid are preferably removed from the reaction mixture by a water wash or neutralized with a suitable base, such as $Na_2CO_3$.

The bromodichlorobenzene fraction obtained from the bromination reaction may be debrominated to regenerate the dichlorobenzene. This is done by reacting the bromodichlorobenzene with about an equimolar amount of hydrogen, the reaction being carried out in an inert liquid solvent in the presence of a hydrogenation catalyst and a halogen acid acceptor. Suitable solvents include cyclohexane, benzene, xylene, and the lower aliphatic alcohols. The hydrogenation may be run at or slightly above room temperature and from about one to about ten atmospheres pressure. Suitable catalysts for the hydrogenation include palladium, platinum, nickel, cobalt, rhodium, and ruthenium. Good results have been obtained with finely divided palladium catalyst, preferably dispersed on an inert carrier such as charcoal or diatomaceous earth. A halogen acid acceptor is necessary to permit the debromination reaction to go to completion. The amount required is one molar equivalent per mole of bromide present and somewhat in excess of this amount may be used. As halogen acceptors, we prefer sodium acetate or calcium hydroxide. The details of the debromination reaction are more fully set forth in Britton and Keil, U.S. 2,725,405.

The regenerated dichlorobenzene may be separated from the debromination reaction mixture by conventional methods. Preferably, the mixture is filtered to remove hydrogenation catalyst and other insoluble material and the product is separated from the solvent by distillation.

When a dichlorobenzene mixture, consisting essentially of the meta and para isomers is brominated according to our process using about one mole of brominating agent per mole of m-dichlorobenzene, the m-dichlorobenzene is brominated essentially exclusively and entirely to make substantially pure 1-bromo-2,4-dichlorobenzene. This compound may be isolated and used as such or it may be debrominated to regenerate m-dichlorobenzene of very high purity. Examples 1 and 2 are illustrative.

EXAMPLE 1

A mixture consisting of 13.65 g. moles of m-dichlorobenzene and 6.35 g. moles of p-dichlorobenzene, with 26 g. of $FeCl_3$ added, was held at 10–15° C. while 13.6 g. moles of liquid bromine was added uniformly over a period of 16 hours. The reaction mixture was then warmed to room temperature and washed three times with one liter portions of water. The second water wash contained a small amount of NaOH to neutralize any residual acidity. The washed product was then separated by fractional distillation through a packed column. Two fractions and a residue were obtained.

Fraction 1: B. range 91–13° C./58 mm. (largely at 92° C./58), 6.53 g. moles dichlorobenzenes, assay 7.5% meta, 92.5% para.

Fraction 2: B. range 136–142° C./58 mm. (99% at 141–2° C./58 mm.), 13.05 g. moles 1-bromo-2,4-dichlorobenzene, 100% assay by infrared analysis.

Residue: 0.31 g. mole, largely dibromodichlorobenzene.

By a slight further bromination of Fraction 1, substantially all the m-dichlorobenzene is brominated, thus leaving the pure para isomer as the sole non-brominated material. Distillation of the bromodichlorobenzene fraction prior to debromination is not essential.

EXAMPLE 2

An 0.8 g. mole portion of Fraction 2 from Example 1 dissolved in 800 cc. methanol with 0.41 g. mole of calcium hydroxide present as a halogen acid acceptor was reacted with 0.8 g. mole of hydrogen under an initial pressure of 150 lbs./sq. in. gauge at 27–45° C., using 3 g. of 5% palladium on carbon as the hydrogenation catalyst. The reaction mixture was filtered and distilled to remove essentially all the methanol. Water was then added to the distillation residue and the m-dichlorobenzene was steam distilled and separated. A yield of 0.76 g. mole of product assaying 100% m-dichlorobenzene was obtained. This represents an overall recovery from the original meta-para mixture of 91% of the m-dichlorobenzene as an essentially 100% pure product.

Table 1 gives the data obtained when the conditions of the bromination reaction as illustrated by Example 1 were varied. Except for the variations in conditions and procedure shown in the table, the brominations of the meta-para-dichlorobenzene mixtures were run as in Example 1.

*Table 1*

| g. Mole Dichlorobenzene | | $Br_2$, g. Moles | Catalyst, 1% by wt. | Temp., °C. | Time, Min. | g. Mole Product | | |
|---|---|---|---|---|---|---|---|---|
| Meta | Para | | | | | Unreacted | | 1-Bromo-2,4-Dichlorobenzene |
| | | | | | | Meta | Para | |
| 0.6825 | 0.3175 | 0.68 | $FeCl_3$ | 150 | 9 | 0.0395 | 0.286 | 0.598 |
| 0.6825 | 0.3175 | 0.68 | $AlCl_3$ | 66 | 30 | 0.083 | 0.284 | 0.510 |
| 0.6825 | 0.3175 | ¹(0.68) | $FeCl_3$ | 77 | 15 | 0.187 | 0.317 | 0.416 |
| 1.00 | 0.47 | 1.0 | $FeCl_3$ | 60 | 60 | 0.02 | 0.45 | 0.942 |

¹ 0.68 g. mole BrCl used.

Separation of the ortho and meta isomers from a mixture of the three isomers of a typical equilibrium composition is shown in Example 3.

EXAMPLE 3

A mixture of 1.25 g. moles of m-dichlorobenzene, 0.2 g. mole of o-dichlorobenzene, and 0.54 g. mole of p-dichlorobenzene was reacted with 1.45 g. moles of bromine in the manner described in Example 1. From the resulting reaction product, there was separated 1.24 g. moles of bromodichlorobenzene. This, when hydrogenated to remove bromine by the procedure of Example 2, yielded the equivalent quantity of dichlorobenzene which assayed 89% meta, 10% ortho, and 1% paradichlorobenzene.

We claim:

1. In a process for separating mixtures of isomeric dichlorobenzenes consisting largely of the meta and para isomers, the steps of reacting said mixtures with up to about one mole of a brominating agent selected from the group consisting of bromine and bromine chloride per mole of combined meta and orthodichlorobenzene therein contained, the quantity of said brominating agent being sufficient to increase the mole fraction of p-dichlorobenzene in the unbrominated dichlorobenzene substantially, in the presence of an effective amount of a nuclear substitution bromination catalyst at a temperature of about 0° C. to about 170° C. and separating the bromodichlorobenzene thereby produced.

2. A process for separating m-dichlorobenzene and o-dichlorobenzene from p-dichlorobenzene in ternary mixtures of isomeric dichlorobenzenes consisting largely of the meta and para isomers and wherein the meta isomer is present in excess over the ortho isomer, which process comprises reacting said mixtures with about one mole of a brominating agent selected from the group consisting of bromine and bromine chloride per mole of combined m-dichlorobenzene and o-dichlorobenzene therein contained in the presence of an effective amount of a nuclear substitution bromination catalyst at a temperature of about 0° C. to about 170° C., and separating the bromodichlorobenzene thereby produced from the unbrominated dichlorobenzene.

3. A process as described in claim 2 wherein the brominating agent is elemental bromine.

4. A process as described in claim 2 wherein the brominating agent is bromine chloride.

5. A process as described in claim 2 wherein the bromination catalyst is ferric chloride.

6. A process as described in claim 2 wherein the bromination catalyst is aluminum chloride.

7. A process as described in claim 2 wherein the bromodichlorobenzene is separated from the brominated reaction mixture by fractional distillation.

8. A process for separating m-dichlorobenzene from dichlorobenzene mixtures consisting essentially of the meta and para isomers, which process comprises reacting said mixtures with up to about one mole of a brominating agent selected from the group consisting of bromine and bromine chloride per mole of m-dichlorobenzene content, the quantity of said brominating agent being sufficient to increase the mole fraction of p-dichlorobenzene in the unbrominated dichlorobenzene substantially, in the presence of an effective amount of a nuclear substitution bromination catalyst at a temperature of about 0° C. to about 170° C., separating the 1-bromo-2,4-dichlorobenzene thereby produced from the unbrominated dichlorobenzene.

9. A process as described in claim 8 wherein the brominating agent is elemental bromine.

10. A process as described in claim 8 wherein the brominating agent is bromine chloride.

11. A process as described in claim 8 wherein the bromination catalyst is $FeCl_3$.

12. A process as described in claim 8 wherein the bromination catalyst is $AlCl_3$.

13. A process as described in claim 8 wherein the bromo-m-dichlorobenzene is separated from the brominated reaction mixture by fractional distillation.

14. A process for the separation of m-dichlorobenzene from dichlorobenzene mixtures consisting essentially of the meta and para isomers, which process comprises reacting said mixtures with up to about one mole of bromine per mole of m-dichlorobenzene, the quantity of bromine being sufficient to increase the mole fraction of p-dichlorobenzene in the unbrominated dichlorobenzene substantially in the presence of $FeCl_3$, at a temperature of about 0° C. to about 170° C., separating the thereby produced 1-bromo-2,4-dichlorobenzene from the unbrominated dichlorobenzene by fractional distillation, and debrominating the separated 1-bromo-2,4-dichlorobenzene to m-dichlorobenzene by reacting it with approximately one molar equivalent of hydrogen while dissolved in an inert liquid medium and in the presence of a hydrogenation catalyst and a halogen acid acceptor.

15. A process for making 1-bromo-2,4-dichlorobenzene which comprises reacting a dichlorobenzene mixture consisting essentially of the meta and para isomers with up to about one mole of a brominating agent selected from the group consisting of bromine and bromine chloride per mole of m-dichlorobenzene content, the quantity of said brominating agent being sufficient to increase the mole fraction of p-dichlorobenzene in the unbrominated dichlorobenzene substantially at about 0–170° C. in the presence of an effective amount of a nuclear substitution bromination catalyst, and separating the 1-bromo-2,4-dichlorobenzene thereby produced.

References Cited in the file of this patent

UNITED STATES PATENTS

| 1,923,419 | Britton | Aug. 22, 1933 |
| 2,725,405 | Britton et al. | Nov. 29, 1955 |

FOREIGN PATENTS

| 860,198 | Germany | Dec. 18, 1952 |

OTHER REFERENCES

DeLa Mare et al.: "Aromatic Substitution, Nitration and Halogenation," 1959, Academic Press, Inc., N.Y. publ. p. 131–2.